US008817290B2

(12) United States Patent
Toyama (10) Patent No.: US 8,817,290 B2
(45) Date of Patent: Aug. 26, 2014

(54) INFORMATION PROCESSING APPARATUS, PRINT CONTROL METHOD, AND STORAGE MEDIUM FOR DETECTING OVERLAP PRINT

(75) Inventor: Masaki Toyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 145 days.

(21) Appl. No.: 13/164,369

(22) Filed: Jun. 20, 2011

(65) Prior Publication Data

US 2011/0317210 A1    Dec. 29, 2011

(30) Foreign Application Priority Data

Jun. 25, 2010   (JP) .................................. 2010-144937

(51) Int. Cl.
*G06K 15/00* (2006.01)
(52) U.S. Cl.
USPC .......... 358/1.14; 358/1.9; 358/1.15; 358/1.16
(58) Field of Classification Search
CPC .... G06F 3/1218; G06F 3/1253; G06F 3/1285
USPC ........................................ 358/1.9, 1.14–1.16
See application file for complete search history.

(56) References Cited

U.S. PATENT DOCUMENTS

| | | | | |
|---|---|---|---|---|
| 2004/0184043 | A1* | 9/2004 | Hirosugi et al. | 358/1.1 |
| 2006/0007469 | A1* | 1/2006 | Uruma | 358/1.14 |
| 2007/0097423 | A1* | 5/2007 | Kawano | 358/1.15 |
| 2009/0147290 | A1* | 6/2009 | Tomita | 358/1.9 |

FOREIGN PATENT DOCUMENTS

| | | |
|---|---|---|
| JP | 2002-351634 A | 12/2002 |
| JP | 2009-129265 A | 6/2009 |

* cited by examiner

*Primary Examiner* — Ngon Nguyen
*Assistant Examiner* — Quyen V Ngo
(74) *Attorney, Agent, or Firm* — Canon USA, Inc., IP Division (57) ABSTRACT

An information processing apparatus for selecting the stored print job or the document data as a print target according to a user operation via an input device, performing setting of printing to the selected print target according to the user operation, and comparing the setting information included in the print job with the setting information indicating the contents of the performed setting when it is determined that the print job is selected, and when the comparison indicates that the setting information included in the print job and the setting information indicating the contents of the setting performed in the setting unit match, performing warning, and when the comparison indicates that the setting information included in the print job and the setting information indicating the contents of the setting performed in the setting unit do not match, instructing the image forming apparatus to perform printing.

6 Claims, 8 Drawing Sheets

INFORMATION PROCESSING APPARATUS, PRINT CONTROL METHOD, AND STORAGE MEDIUM FOR DETECTING OVERLAP PRINT

BACKGROUND OF THE INVENTION

1. Field of the Invention

The present invention relates to an image processing apparatus for instructing printing.

2. Description of the Related Art

Conventionally, systems for performing printing by managing an electronic document (document), and transferring a print job generated from the document using a printer driver to a printing apparatus have been provided. In recent years, methods of comparing an input print job with each unprocessed print job on an unprocessed print job management table to prevent overlap print have been discussed in Japanese Patent Application Laid-Open No. 2002-351634.

Further, methods of transmitting a generated print job to a multifunction peripheral (MFP) on condition that overlap print of the generated print job is not prohibited by prohibition information contained in history information have been discussed in Japanese Patent Application Laid-Open No. 2009-129265.

However, according to the above mentioned methods, when printing that can avoid the overlap print is performed, the comparison is uniformly performed. Therefore, the processing efficiency may be decreased.

SUMMARY OF THE INVENTION

One of the aspect of present inventions is directed to an information processing apparatus and a print control method capable of further increasing the efficiency of processing in performing printing capable of avoiding overlap print.

According to an aspect of the present invention, an information processing apparatus includes a storage unit configured to generate a print job associated with document data, and including setting information indicating contents of setting of printing, when the printing of the document data is instructed in an image forming apparatus, and store the generated print job, a selection unit configured to select the generated print job stored in the storage unit or the document data as a print target according to a user operation via an input device, a setting unit configured to perform setting of printing to the print target selected with the selection unit according to the user operation, and an instruction unit configured to make a comparison the setting information included in the print job with the setting information indicating the contents of the setting performed in the setting unit when the instruction unit determines that the print job is selected with the selection unit, and when the comparison indicates that the setting information included in the print job and the setting information indicating the contents of the setting performed in the setting unit match, perform warning, and when the comparison indicates that the setting information included in the print job and the setting information indicating the contents of the setting performed in the setting unit do not match, instruct the image forming apparatus to perform printing, and when the instruction unit determines that the document data is selected with the selection unit, instruct the image forming apparatus to perform printing.

According to another aspect of the present invention, an information processing apparatus includes a storage unit configured to generate a print job associated with document data, and including setting information indicating contents of setting of printing, when the printing of the document data is instructed in an image forming apparatus, and store the generated print job, a selection unit configured to select the generated print job stored in the storage unit or the document data as a print target according to a user operation via an input device, a setting unit configured to perform setting of printing to the print target selected by the selection unit according to the user operation, an acquisition unit configured to specify document data associated with the print job if the acquisition unit determines that the print job is selected by the selection unit, and acquire a print job associated with the document data from the print jobs stored in the storage unit, and an instruction unit configured to confirm whether the print job is acquired by the acquisition unit, when the instruction unit determines that the print job is acquired, compare setting information included in the print job with the setting information indicating the contents of the setting performed in the setting unit, and when the comparison indicates that the setting information included in the print job and the setting information indicating the contents of the setting performed in the setting unit match, perform warning, and when the comparison indicates that the setting information included in the print job and the setting information indicating the contents of the setting performed in the setting unit do not match, instruct the image forming apparatus to perform printing.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
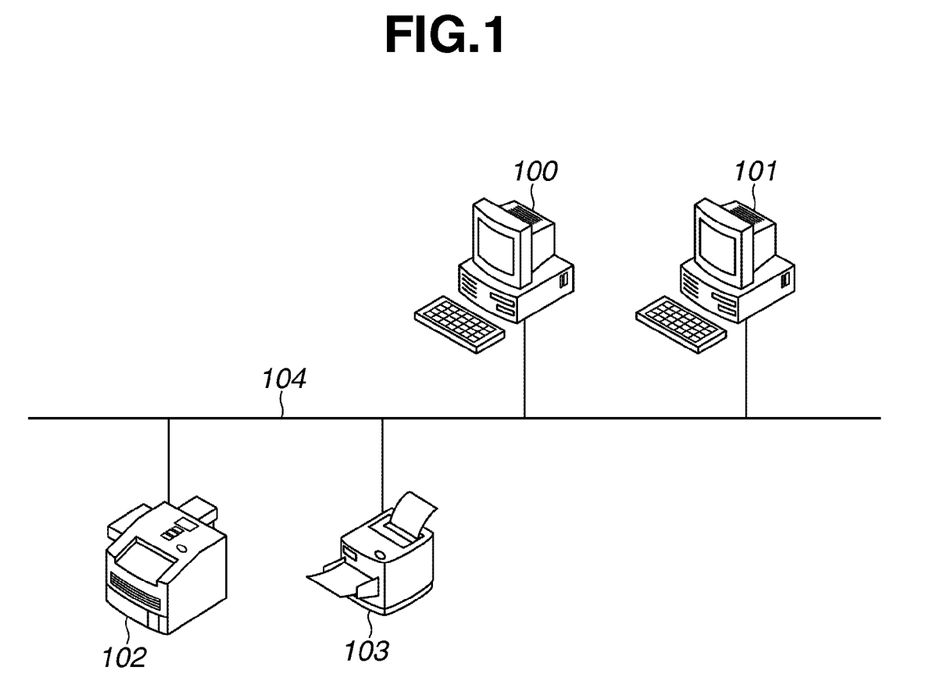
FIG. 1 illustrates an example configuration of a file management system.

FIG. 1 illustrates an example configuration of a file management system according to an exemplary embodiment. In the file management system, file management apparatuses 100 and 101 and printing apparatuses 102 and 103 can communicate with each other via a network 104. The number of file management apparatuses and the printing apparatuses is not limited to the above number, and an appropriate number can be employed.

The file management apparatuses 100 and 101 are an example of information processing apparatuses (computers). The hardware configuration of the file management apparatuses 100 and 101 is similar to that of general computers. For example, the file management apparatuses 100 and 101 have a keyboard and a pointing device (so-called mouse, or the like) that are examples of an input device that receives input from a user.

Further, for example, the file management apparatuses 100 and 101 each have a display device that displays various types of information, and a random access memory (RAM), a hard disk drive (HDD), a read-only memory (ROM), and a compact disk read-only memory (CD-ROM), which are examples of storage devices for storing various programs and execution information.

Further, for example, the file management apparatuses 100 and 101 each have an input/output device (I/O device) that performs communication with external devices, and a central processing unit (CPU) that executes programs. The connection configuration with the external devices can be wired or wireless connection. In the exemplary embodiment, by performing processing according to the program stored in the RAM by the CPU, functions and processing in a flowchart (described below) in the file management apparatuses 100 and 101 are implemented.

The hardware configuration of the printing apparatuses 102 and 103 is similar to that of general printing apparatuses. For example, the printing apparatuses 102 and 103 each have an I/O device that transmits and receives data to/from the file management apparatuses 100 and 101 via a communication medium such as the network 104, and transmit a device ID, or the like to the file management apparatuses 100 and 101 via the I/O device.

Further, for example, the printing apparatuses 102 and 103 each receive various control commands form the file management apparatuses 100 and 101 via the I/O device, and perform processing. The printing apparatuses 102 and 103 are an example of image forming apparatuses. The printing apparatuses 102 and 103 each can be a multifunctional device having a printing function, and other functions such as a copy function, a facsimile function, a scanner function, and a file transmission function.

In the file management apparatuses 100 and 101, a predetermined operating system (OS) is installed, and various types of applications for executing processing for implementing specific functions are installed. Further, in the file management apparatuses 100 and 101, an integrated application for integrating and managing various functions on the desktop is installed. The integrated application has a function for reducing printing costs, and a function for integrating and managing information.

Figure 2:
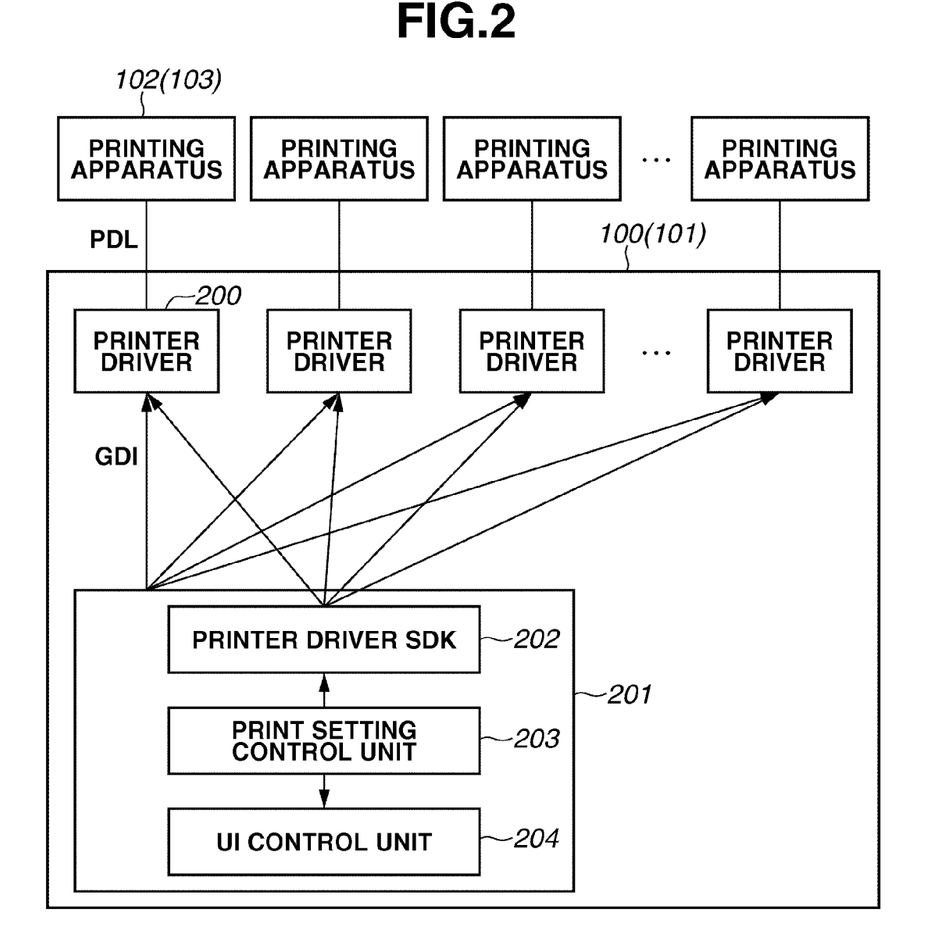
FIG. 2 illustrates an example software configuration of the file management system.

FIG. 2 illustrates an example software configuration of the file management apparatuses 100 and 101. A printer driver 200 is installed as a system application on each of the HDDs of the file management apparatuses 100 and 101, and transmits a print job to the printing apparatus 102 or printing apparatus 103, which the printer driver 200 can communicate with.

Integrated application 201 includes a UI for executing the processing for implementing the above-described various functions (the print function, and the like). The integrated application 201 receives a request from a user via the UI, and performs overall management of the execution of the processing of each function. The integrated application 201 includes a printer driver SDK 202, a print setting control unit 203, and a UI control unit 204.

The printer driver SDK 202 includes an I/F group for performing acquisition or setting of various setting values to the printer driver 200. With the printer driver SDK 202, users can edit the setting values of the printer driver 200 from the UI of the integrated application 201 without using a UI of the printer driver 200.

The print setting control unit 203 sets a setting value set via the UI of the integrated application 201 to the printer driver 200 via the printer driver SDK 202. Further, if the print setting control unit 203 determines that the other setting values of the integrated application 201 are to be changed depending on the setting value set via the UI of the integrated application 201, the print setting control unit 203 instructs the UI control unit 204 to change the values.

For example, in a case where a setting value of an output paper size is changed via the UI of the integrated application 201, if the print setting control unit 203 determines that stapling is not permitted in the changed paper size, the print setting control unit 203 issues an instruction for invalidating stapling to the UI control unit 204. The UI control unit 204 performs overall control of the UI of the integrated application 201. The UI control unit 204 controls, in the UI, display/non-display or valid/invalid of the various setting values, change of setting items, or the like.

The operation of the integrated application 201 is described with reference to FIGS. 3 to 6.

Figure 3:
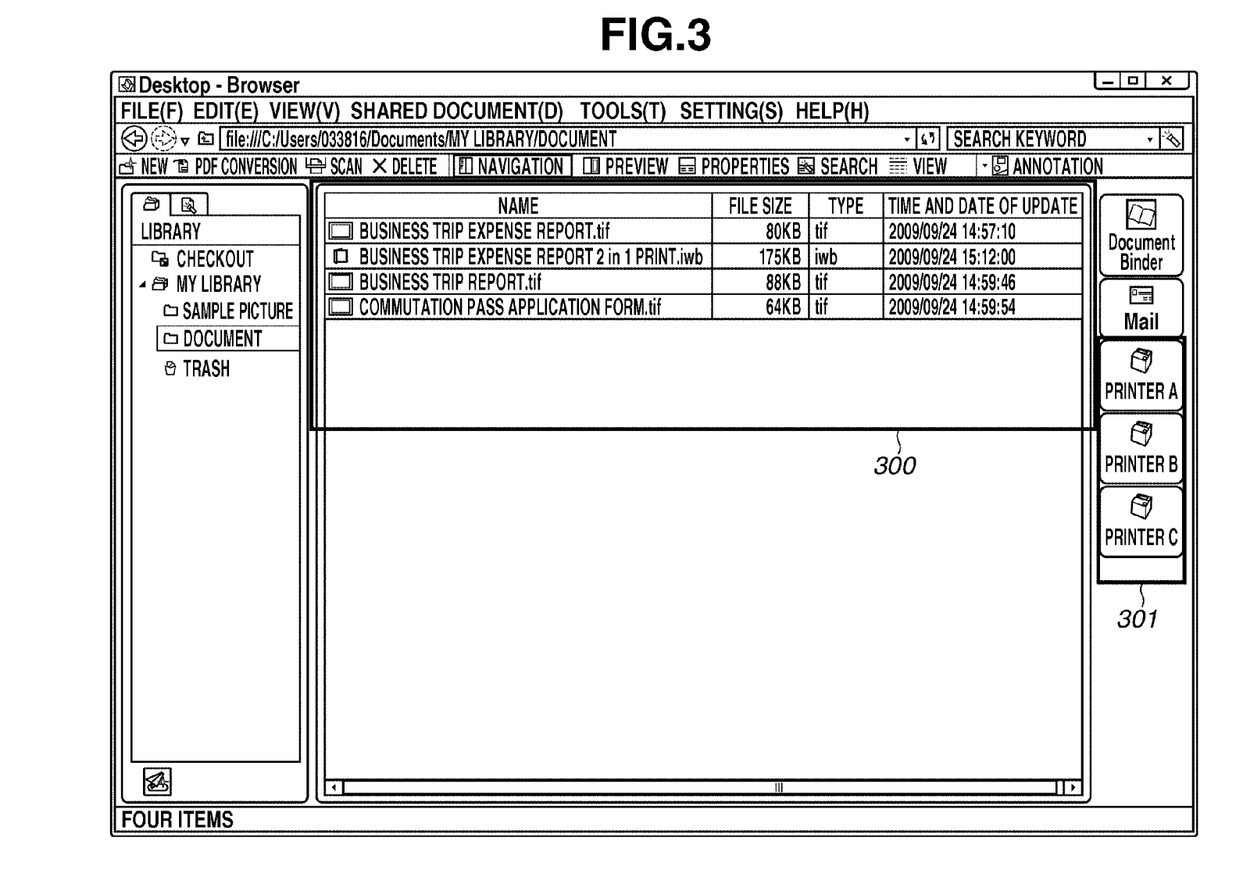
FIG. 3 illustrates an example user interface (UI) output in the file management system.

FIG. 3 illustrates an example UI output from the file management apparatuses 100 and 101. A document selection control 300 selects a print target by operation (user operation) of an input device by a user. More specifically, the document selection control 300 displays a document (document data) managed in the file management apparatuses 100 and 101 or information of a print job so that the user can select one by the user operation.

The print job includes information (print setting information indicating contents of print setting) indicating setting values and a document or link information to a document. In other words, at least, the print job is associated with a document, and includes the print setting information that is an example of setting information.

An output printer control 301 selects the printer driver 200 of the output destination of the print job by a user operation. The printer driver 200 that can be selected by the output printer control 301 is the printer driver 200 that is installed on the OS.

Figure 4:
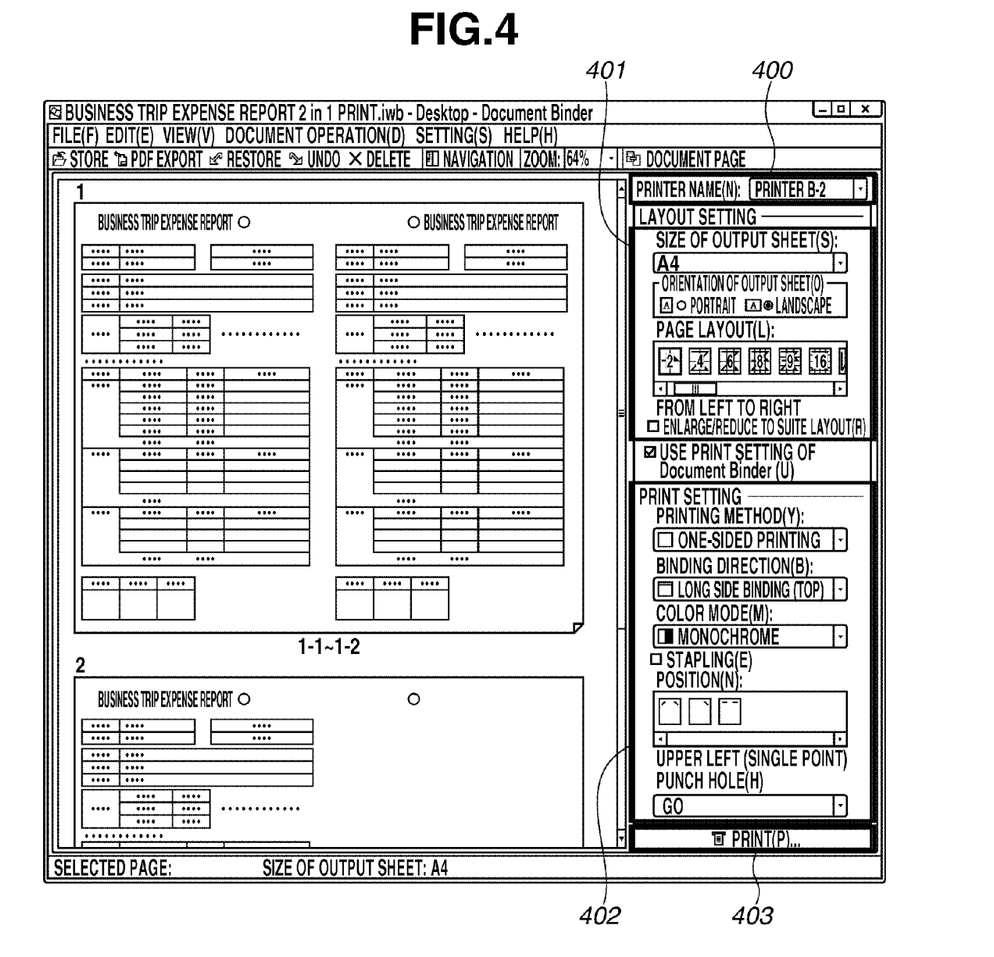
FIG. 4 illustrates an example UI output in the file management system.

If a document or a print job is selected by the document selection control 300, and the printer driver 200 of the output destination is selected by the output printer control unit 301, the UI illustrated in FIG. 3 is transferred to the UI illustrated in FIG. 4.

FIG. 4 illustrates an example of the UI (UI for performing the print setting) output from the file management apparatuses 100 and 101. A printing apparatus selection control 400 selects the printing apparatus 102 or 103 according to a user operation.

A print setting control 401 performs print setting of a setting item that does not use the printer driver SDK 202 according to the user operation. A print setting control 402 performs print setting of a setting item that uses the printer driver SDK 202 according to a user operation.

According to the user operation, a print instruction control 403 receives a print instruction for starting the printing according to the print setting information indicating the contents of the print setting by the print setting controls 401 and 402 by the printing apparatus 102 or 103 selected by the printing apparatus selection control 400.

If the print instruction is received, the integrated application 201 instructs printing based on the target selection information indicating the contents of the selection by the document selection control 300, the printing apparatus selection information indicating the contents of the selection by the printing apparatus selection control 400, the print setting information, and the like.

Figure 5:
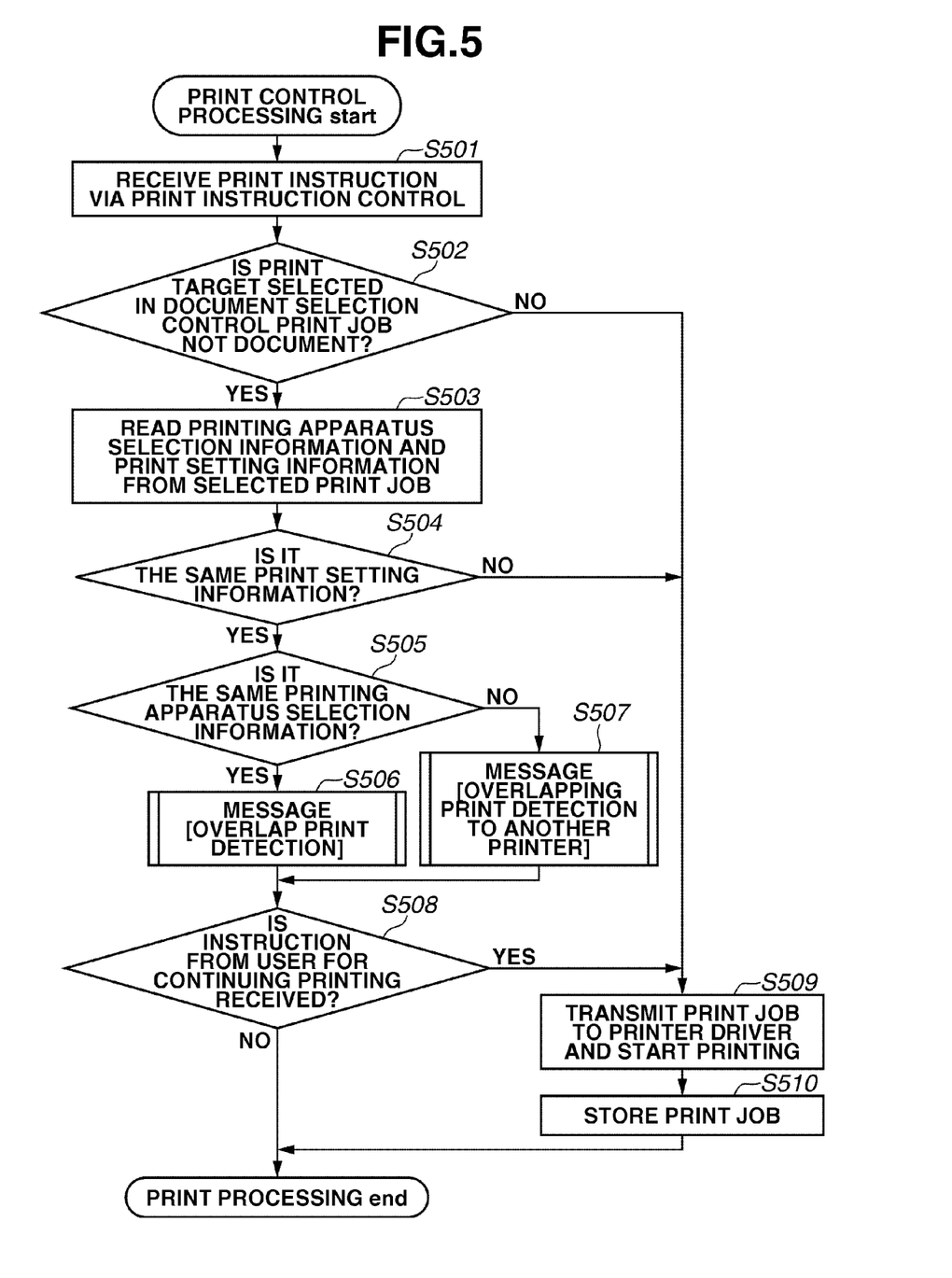
FIG. 5 illustrates an example flowchart according to a print control processing program.

FIG. 5 is an example of a flowchart according to a print control processing program performed when the integrated application 201 instructs the selected printing apparatus to perform printing.

In step S501, the integrated application 201 receives a print instruction via the print instruction control 403. In step S502, the integrated application 201 identifies whether the print target selected in the document selection control 300 is a print job or a document itself. In step S502, if the integrated application 201 determines that the print target is a print job (YES in step S502), the integrated application 201 performs processing illustrated in step S503. If the integrated application 201 determines that the print target is not a print job (NO in step S502), the integrated application 201 performs processing illustrated in step S509.

In step S503, the integrated application 201 reads out printing apparatus selection information and print setting information included in the print job. In the processing, the integrated application 201 manages historical information (printing apparatus selection information and print setting information) of printing of the past in the print job. If the integrated application 201 determines that a plurality of pieces of information is included, the integrated application 201 reads out the latest information.

In step S504, the integrated application 201 compares the print setting information read out in step S503 with the setting values (print setting information) of the current print setting controls 401 and 402, and determines whether the information is the same. If the integrated application 201 determines that the print setting information is the same (YES in step S504), the integrated application 201 performs processing illustrated in step S505. If the integrated application 201 determines that the print setting information is not the same (NO in step S504), the integrated application 201 performs the processing illustrated in step S509.

In step S505, the integrated application 201 compares the printing apparatus selection information read out in step S503 with the setting values (printing apparatus selection information) of the printing apparatus selection control 400, and determines whether the information is the same. If the integrated application 201 determines that the printing apparatus selection information is the same (YES in step S505), the integrated application 201 performs processing illustrated in step S506. If the integrated application 201 determines that the printing apparatus selection information is not the same (NO in step S505), the integrated application 201 performs the processing illustrated in step S507.

Figure 6A:
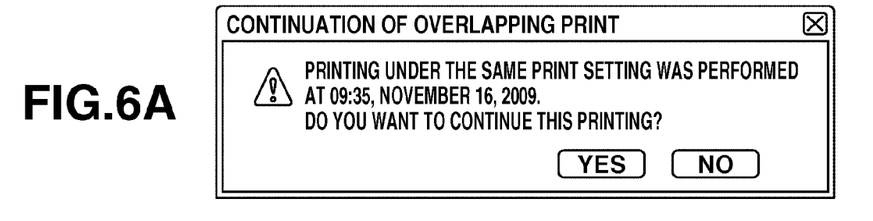
FIGS. 6A to 6E illustrate examples of messages.

In step S506, the integrated application 201 indicates that the printing apparatus and the setting of the print selected by the user are the same printing apparatus and print setting of the latest in the past. Then, the integrated application 201 outputs (displays) a warning message for confirming whether the printing is to be performed, and waits for a user operation. If the user operation is received, the integrated application 201 performs processing illustrated in step S508. FIG. 6A illustrates an example of the warning message.

Figure 6B:
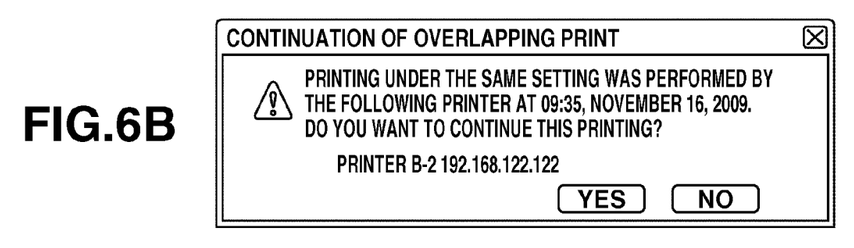

In step S507, the integrated application 201 displays a warning message for indicating that the print setting selected by the user is the same as that of the latest one in the past, and for confirming whether the printing is to be performed, and waits for a user operation. If a user operation is received, the integrated application 201 performs processing illustrated in step S508. FIG. 6B illustrates an example of the warning message.

In step S508, the integrated application 201 determines whether printing continuation is instructed. If the integrated application 201 determines that the printing continuation is instructed (YES in step S508), the integrated application 201 performs processing illustrated in step S509. If the integrated application 201 determines that the printing continuation is not instructed (NO in step S508), the integrated application 201 ends the printing control processing.

In step S509, the integrated application 201 generates (or updates) a print job based on the printing apparatus selection information, the print setting information, and the like, transmits the print job to the selected printing apparatus via the selected printer driver 200, and starts the printing.

In the processing, if the print job is selected in the document selection control 300, to the print job, the integrated application 201 performs update the current print setting information as the latest history information while the print setting information of the past, or the like is held as the history information. The integrated application 201 may generate a new print job instead of updating the print job.

In step S510, the integrated application 201 stores the print job in the storage device. If the storage is performed, the print job can be selected as a print job using the document selection control 300.

As described above, if the integrated application 201 determines that a print job is selected, based on a result of a comparison between current print setting information and print setting information of the past (print setting information included in the selected print job), instructs a selected printing apparatus to perform the printing.

On the other hand, if the integrated application 201 determines that a document is selected, the integrated application 201 instructs the selected printing apparatus to perform the printing without comparing the information. By the above-described configuration, overlap print can be efficiently avoided.

In the first exemplary embodiment, the comparison between the print setting information included in the print job selected in the document selection control 300 and the current setting values (print setting information) is performed, and whether the current printing is the same as that of the past is determined.

However, a print job associated with the document selected in the document selection control 300 may be separately stored. Further, a document associated with the print job selected in the document selection control 300 may be associated with another print job and stored.

To solve the problem, in the present exemplary embodiment, a configuration for detecting whether the print setting information matches with each other and instructing a selected printing apparatus to perform the printing even in the above-described case, is employed. In the present exemplary embodiment, to components similar to those in the first exemplary embodiment, the same reference numerals are applied, their descriptions are omitted, and different points are mainly described.

Figure 7:
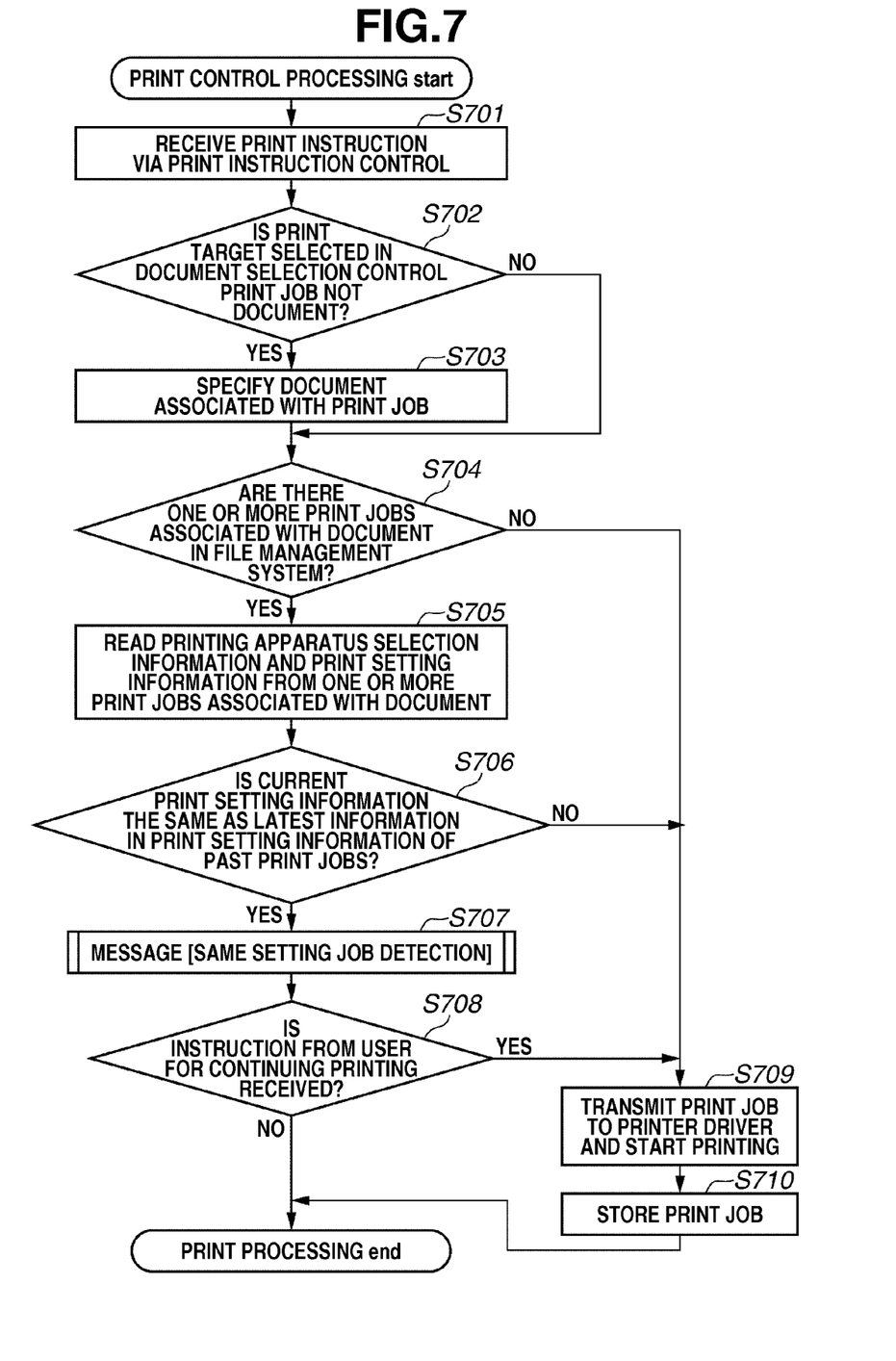
FIG. 7 illustrates an example flowchart according to a print control processing program.

FIG. 7 is an example of a flowchart according to a print control processing program to be performed when the integrated application 201 instructs a selected printing apparatus to perform printing.

In step S701, the integrated application 201 receives a print instruction via the print instruction control 403. In step S702, the integrated application 201 identifies whether the print target selected in the document selection control 300 is a print job or a document itself.

In step S702, if the integrated application 201 determines that the print target is a print job (YES in step S702), the integrated application 201 performs processing illustrated in step S703. If the integrated application 201 determines that the print target is not a print job (NO in step S702), the integrated application 201 performs processing illustrated in step S704. In step S703, the integrated application 201 specifies a document associated with the print job, and performs processing illustrated in step S704.

In step S704, the integrated application 201 searches the file management system for a print job associated with the specified document. In step S704, if the integrated application 201 determines that one or more print jobs are retrieved in the search (YES in step S704), the integrated application 201 performs processing illustrated in step S705. If the integrated application 201 determines that no print job is retrieved in the search (NO in step S704), the integrated application 201 performs processing illustrated in step S709.

In step S705, the integrated application 201 reads out printing apparatus selection information and print setting information included in each of the one or more print jobs obtained in the search in step S704. In a case where the history of the information (printing apparatus selection information and print setting information) in the past printing is managed in the print job, the latest information is read out.

In step S706, the integrated application 201 compares the latest print setting information in the one or more pieces of print setting information read out in step S705 with the current setting values (print setting information), and determines whether the information is the same. If the integrated application 201 determines that the print setting information is the same (YES in step S706), the integrated application 201 performs processing illustrated in step S707. If the integrated application 201 determines that the print setting information is not the same (NO in step S706), the integrated application 201 performs the processing illustrated in step S709.

Figure 6C:
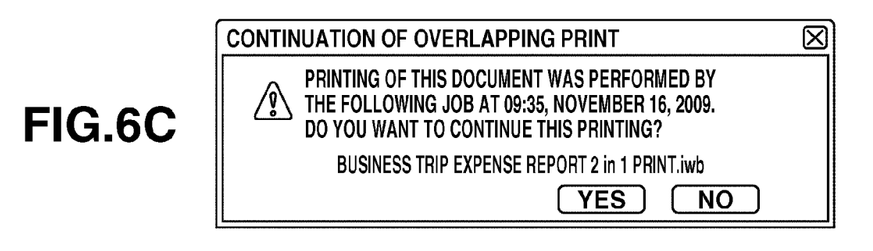

In step S707, the integrated application 201 display a warning message for indicating that a print job printed by the printing apparatus and the print setting selected by the user exists, and for confirming whether to perform the printing, and waits for a user operation. FIG. 6C illustrates an example of the warning message.

In step S708, the integrated application 201 determines whether printing continuation is instructed. If the integrated application 201 determines that the printing continuation is instructed (YES in step S708), the integrated application 201 performs processing illustrated in step S709. If the integrated application 201 determines that the printing continuation is not instructed (NO in step S708), the integrated application 201 ends the printing control processing.

In step S709, the integrated application 201 generates (or updates) a print job using the printing apparatus selection information, the print setting information, and the like, transmits the print job to the selected printing apparatus via the selected printer driver 200, and starts the printing.

In the processing, if the print job is selected in the document selection control 300, to the print job, the integrated application 201 performs update the current print setting information as the latest history information while the print setting information of the past, or the like is held as the history information. The integrated application 201 may generate a new print job instead of updating the print job.

In step S710, the integrated application 201 stores the print job in the storage device. If the storage is performed, the print job can be selected as a print job using the document selection control 300.

As described above, if the integrated application 201 determines that a print job is selected, based on a result of a comparison between current print setting information and print setting information of a document associated with the selected print job, instructs the selected printing apparatus to perform the printing. By the above-described configuration, overlap print can be efficiently and effectively avoided.

In the first exemplary embodiment, the comparison between the print setting information included in the print job selected in the document selection control 300 and the current setting values (print setting information) is performed, and whether the current printing is the same as that of the past is determined.

However, in the first exemplary embodiment, in the print setting information to be compared, especially, if a different value is specified for the setting information of the number of print copies that indicates the number of print copies, a possibility that the printing may be overlap print cannot be eliminated.

To solve above problem, in the present exemplary embodiment, a configuration of making a notification of the difference in the number of print copies to the user, is employed. In the present exemplary embodiment, to components similar to those in the first exemplary embodiment, the same reference numerals are applied, their descriptions are omitted, and different points are mainly described.

Figure 8:
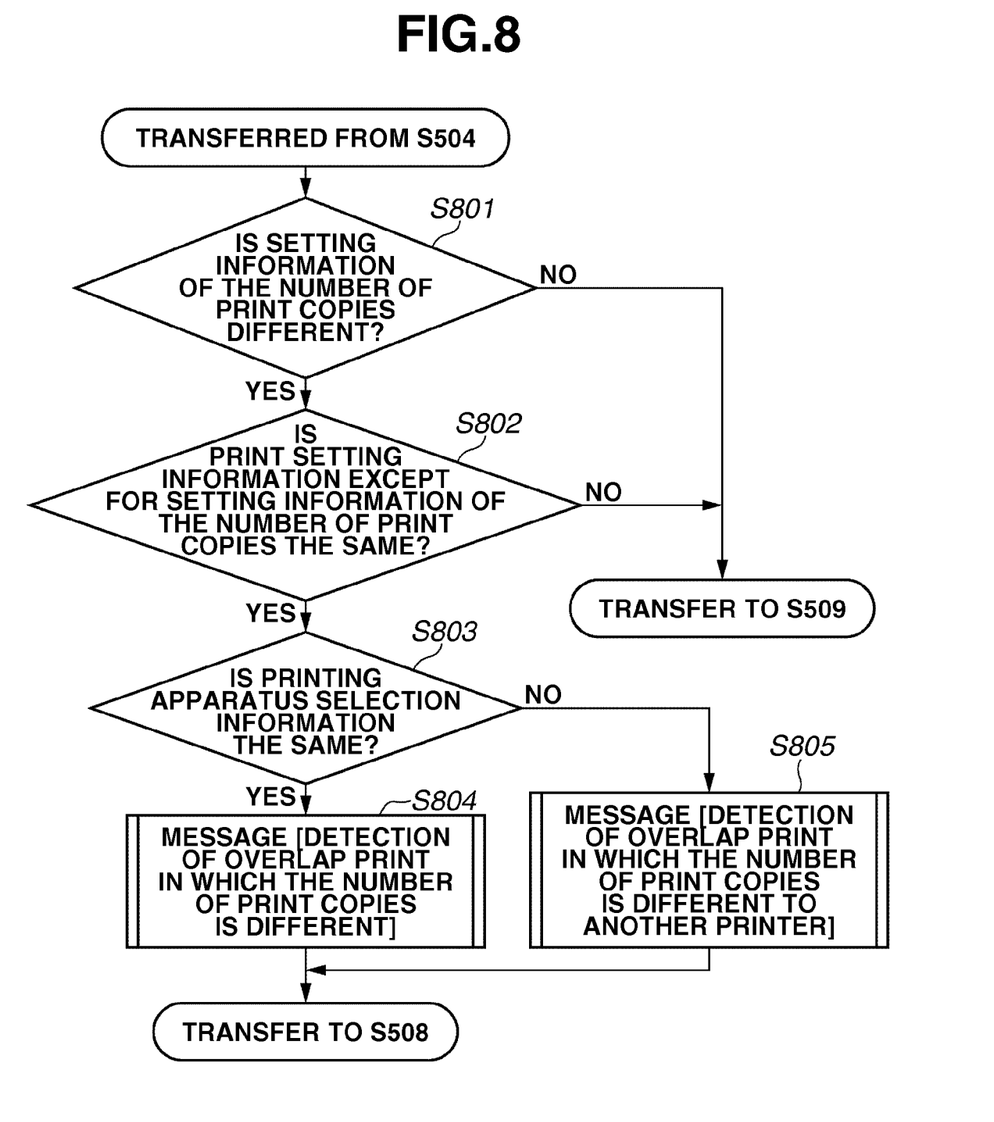
FIG. 8 illustrates an example flowchart of a part according to a print control processing program.

FIG. 8 illustrates an example of a flowchart according to a part of a print control processing program. In step S504 of the print control processing, the integrated application 201 compares the print setting information read out in step S503 with the current setting values (print setting information), and determines whether the information is the same. If the integrated application 201 determines that the print setting information is the same (YES in step S504), the integrated application 201 performs the processing illustrated in step S505. If the integrated application 201 determines that the print setting information is not the same (NO in step S504), the integrated application 201 performs processing illustrated in step S801.

In step S801, the integrated application 201 compares the print setting information read out in step S503 with the current setting values (print setting information), and determines whether the setting information of the number of print copies included in the print setting information differs from each other. If the integrated application 201 determines that the setting information of the number of print copies is different from each other (YES in step S801), the integrated application 201 performs processing illustrated in step S802. If the integrated application 201 determines that the setting information of the number of print copies is not different from each other (NO in step S801), the integrated application 201 performs the processing illustrated in step S509.

In step S802, the integrated application 201 compares the print setting information read out in step S503 with the current setting values (print setting information), and determines whether the print setting information except for the setting information of the number of print copies is the same. If the integrated application 201 determines that the print setting information is the same (YES in step S802), the integrated application 201 performs processing illustrated in step S803. If the integrated application 201 determines that the print setting information is not the same (NO in step S802), the integrated application 201 performs the processing illustrated in step S509.

In step S803, the integrated application 201 compares the printing apparatus selection information read out in step S503 with the current setting values (printing apparatus selection information), and determines whether the information is the same. If the integrated application 201 determines that the information is the same (YES in step S803), the integrated application 201 performs processing illustrated in step S804. If the integrated application 201 determines that the information is not the same (NO in step S803), the integrated application 201 performs the processing illustrated in step S805.

Figure 6D:
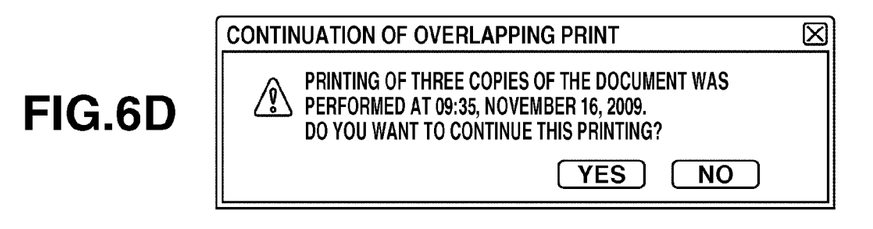

In step S804, the integrated application 201 indicates that the printing apparatus and the setting of the print except for the number of print copies selected by the user are the same as those of the latest in the past. Then, the integrated application 201 displays a warning message for confirming whether to perform the printing, and waits for a user operation. FIG. 6D illustrates an example of the warning message.

Figure 6E:
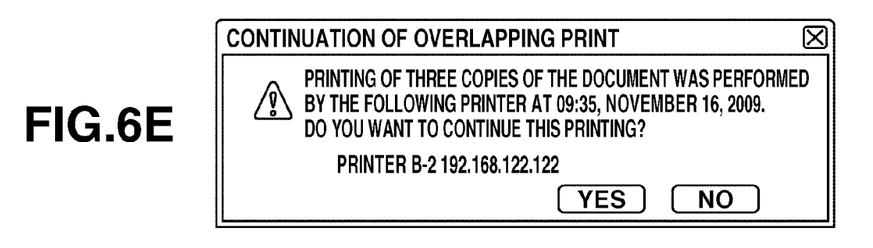

In step S805, the integrated application 201 indicates that the print setting except for the number of print copies selected by the user is the same as that of the latest in the past. Then, the integrated application 201 displays a warning message for confirming whether to perform the printing, and waits for a user operation. FIG. 6E illustrates an example of the warning message. By the above-described configuration, overlap print can be efficiently and effectively avoided.

The present invention can be implemented by executing the following processing. That is, software (program) to implement the functions of the above-described exemplary embodiments is supplied to a system or apparatus via a network or various storage media. A computer (or central processing unit (CPU) or micro processing unit (MPU)) of the system or apparatus reads out and executes the program.

By the above-described configurations of the exemplary embodiments, the efficiency of the processing, when performing printing that can avoid overlap print, can be further increased.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-144937 filed Jun. 25, 2010, which is hereby incorporated by reference herein in its entirety.

What is claimed is:

1. An information processing apparatus comprising:
a storage unit configured to generate a print job including setting information indicating contents of setting of printing, when printing of document data is instructed to an image forming apparatus, and store the generated print job;
a selection unit configured to select the generated print job stored by the storage unit or the document data as a print target according to a user operation via an input device;
a setting unit configured to perform setting of printing to the print target selected by the selection unit according to the user operation; and
an instruction unit configured to make a comparison of the setting information included in the print job with the setting information indicating the contents of the setting performed by the setting unit when the instruction unit determines that the print job is selected by the selection unit, and when the comparison indicates that the setting information included in the print job and the setting information indicating the contents of the setting performed by the setting unit match, perform warning, and when the instruction unit determines that the document data is selected by the selection unit, instruct the image forming apparatus to perform printing,
wherein the instruction unit compares the setting information included in the print job with the setting information indicating the contents of the setting performed by the setting unit when the comparison indicates that the setting information included in the print job and the setting information indicating the contents of the setting performed by the setting unit do not match, and compares the image forming apparatus instructed to perform printing with an image forming apparatus indicated by the print job, and outputs a message for confirming whether or not to perform printing and indicating when the image forming apparatus instructed to perform printing is different from the image forming apparatus indicated by the print job, when the setting information except for information indicating a number of print copies is the same, and instructs the image forming apparatus to perform printing based on an operation by the user in response to the output message.

2. The information processing apparatus according to claim 1, wherein the warning is performed by displaying a message for confirming whether to perform printing with the contents of the setting performed in the setting unit.

3. An information processing apparatus comprising:
a storage unit configured to generate a print job including setting information indicating contents of setting of printing, when printing of document data is instructed to an image forming apparatus, and store the generated print job;
a selection unit configured to select the generated print job stored by the storage unit or the document data as a print target according to a user operation via an input device;
a setting unit configured to perform setting of printing to the print target selected by the selection unit according to the user operation;
an acquisition unit configured to specify document data associated with the print job if the acquisition unit determines that the print job is selected by the selection unit, and acquire a print job associated with the document data from the print jobs stored in the storage unit; and
an instruction unit configured to confirm whether the print job is acquired by the acquisition unit, when the instruction unit determines that the print job is acquired, make a comparison of the setting information included in the print job with the setting information indicating the contents of the setting performed by the setting unit, and when the comparison indicates that the setting information included in the print job and the setting information indicating the contents of the setting performed by the setting unit match, perform warning,
wherein the instruction unit compares the setting information included in the print job with the setting information indicating the contents of the setting performed by the setting unit when the comparison indicates that the setting information included in the print job and the setting information indicating the contents of the setting performed by the setting unit do not match, and compares the image forming apparatus instructed to perform printing with an image forming apparatus indicated by the print job, and outputs a message for confirming whether or not to perform printing and indicating when the image forming apparatus instructed to perform printing is different from the image forming apparatus indicated by the print job, when the setting information except for information indicating a number of print copies is the same, and instructs the image forming apparatus to perform printing based on an operation by the user in response to the output message.

4. A print control method comprising:

generating a print job including setting information indicating contents of setting of printing, when printing of document data with an image forming apparatus is instructed, and storing the generated print job;

selecting the stored print job or the document data as a print target according to a user operation via an input device;

performing setting of printing to the selected print target according to the user operation; and comparing the setting information included in the print job with the setting information indicating the contents of the setting when it is determined that the print job is selected, and when the comparison indicates that the setting information included in the print job and the setting information indicating the contents of the setting performed by the performing step match, performing warning, and when it is determined that the document data is selected, instructing the image forming apparatus to perform printing, wherein the comparing step compares the setting information included in the print job with the setting information indicating the contents of the setting performed by the performing step when the comparison indicates that the setting information included in the print job and the setting information indicating the contents of the setting performed by the performing step do not match, and compares the image forming apparatus instructed to perform printing with an image forming apparatus indicated by the print job, and outputs a message for confirming whether or not to perform printing and indicating when the image forming apparatus instructed to perform printing is different from the image forming apparatus indicated by the print job, when the setting information except for information indicating a number of print copies is the same, and instructs the image forming apparatus to perform printing based on an operation by the user in response to the output message.

5. The print control method according to claim 4, wherein the warning is performed by displaying a message for confirming whether to perform printing with the contents of the setting performed in the setting unit.

6. A non-transitory computer-readable storage medium in which a control program is stored, which, when loaded into a computer and executed performs a method as claimed in claim 4.

* * * * *